United States Patent [19]
Gordon

[11] 3,782,512
[45] Jan. 1, 1974

[54] SHAFT LOCK ARRANGEMENT

[76] Inventor: Samuel Gordon, 323 Park Ave., Elberon, N.J. 07740

[22] Filed: July 20, 1972

[21] Appl. No.: 273,382

[52] U.S. Cl. .............................. 188/134, 188/110
[51] Int. Cl. .............................................. B60t 7/12
[58] Field of Search .............. 188/110, 134; 192/5, 192/6 R, 7, 8 R

[56] References Cited
UNITED STATES PATENTS
2,572,182  10/1951  Mueller ........................ 192/6 R X
1,937,992  12/1933  Steep ............................... 188/134

*Primary Examiner*—Duane A. Reger
*Attorney*—Robert M. Skolnik

[57] ABSTRACT

The specification describes a shaft lock employing a brake shoe mounted on a slidable sleeve which is, in turn, loosely mounted on the shaft. Counterrotation of the shaft causes a screw threaded portion thereof to engage a threaded portion of the sleeve thereby driving the sleeve along the shift into a fixed brake shoe mounted in proximity to said shaft.

4 Claims, 2 Drawing Figures

PATENTED JAN 1 1974  3,782,512

SHAFT LOCK ARRANGEMENT

This invention relates to an arrangement for automatically locking a shaft from rotating movement and finds specific application where it is desired to prevent a shaft from rotating to prevent damage to an engine or transmission.

The present invention relates to a shaft locking arrangement which automatically prevents counterrotation of the shaft and finds principal application in the boating field, especially in boats having twin engines. In such craft, it is often necessary or desirable to operate with one engine only leaving the second engine off. The movement of the boat under one engine causes rotation of the propeller of the other engine in a direction opposite to its normal driven rotational direction. During such counterrotation, damage to the transmission or engine may result unless such counterrotation is prevented by some shaft locking arrangement.

It has been found that electromechanical devices generally prove complicated in installation and are not capable of any maintenance. The present invention contemplates an automatic arrangement whereby counter-rotation of the shaft causes movement of a sleeve born on the shaft along a screw threaded portion of the shaft, the sleeve driving a brake shoe arrangement into a fixed brake shoe mounted in proximity to a shaft.

It is an object of the invention to provide a simple and expensive arrangement for preventing unwanted motions of the shaft.

A further object of the present invention is the provision of an arrangement for locking the shaft automatically in a twin engine boat when one engine is off.

A further object of the present invention is the provision of an arrangement for preventing rotation of a shaft in a direction of rotation opposite to the shaft's normal direction and thereby preventing damage to the motive power for the shaft.

These as well as further objects and advantages of the invention will become apparent to those skilled in the art from a reading of the company specifications reference being had to the drawings in which.

Figure 1:
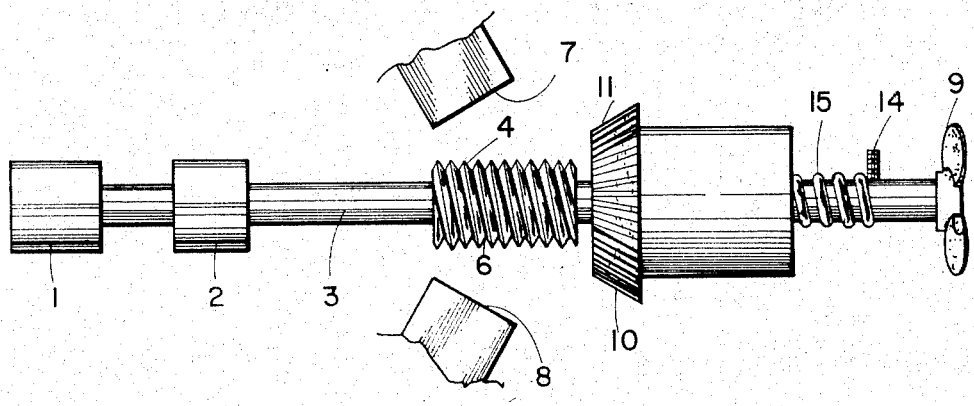
FIG. 1 is a plan view of the locking arrangement according to the invention.

In the Figure, numeral 1 denotes the motor which may be any type of internal combustion engine or any other type of motive means which in turn is connected by a suitable mechanical connection to a suitable transmission 2 for customary purposes. The transmission is in turn connected to shaft 3 which, as shown in the figure, is connected at its other end, to propeller 9.

The shaft 3 has securely affixed thereto, a sleeve 4 which is threaded about its outer diameter. The inner diameter of sleeve 4 is smooth and is designed for tight frictional or other mechanical fit to shaft 3. The screw threads are identified by numeral 6 on sleeve 4. The sleeve is required for installation of the present invention on existing shafts. It is to be understood that the shaft itself may be scored with the screw threads thus eliminating the need for sleeve 4.

Figure 2:
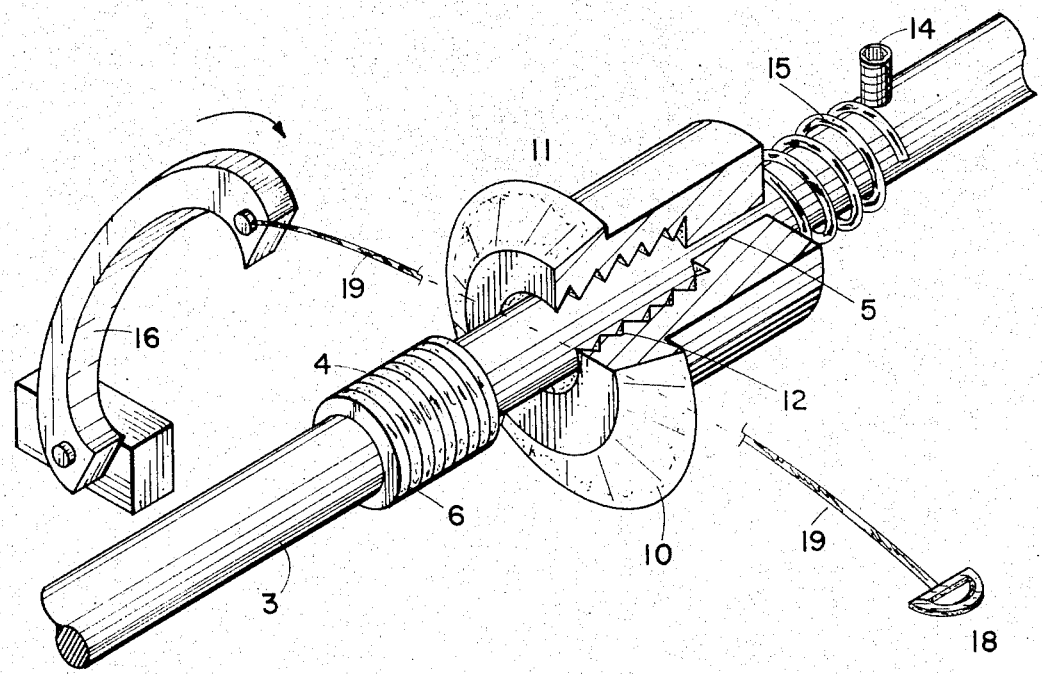
FIG. 2 is an isometric view of the shaft locking arrangement.

Also mounted on shaft 3 is another sleeve 5, which is mounted for loose rotation about the shaft. This sleeve is configured such that flat surfaces shown as 10 and 11 are presented about the diameter of the sleeve. These flat surfaces are formed at an angle respecting the axis of the shaft and are of complementary configuration to fixed surfaces 7 and 8. The sleeve 5 has an internal diameter portion thereto threaded with a screw thread 12, shown in FIG. 2, whose direction is opposite to the thread 6. The internal diameter of threaded portion 12 of sleeve 5 is such that the threaded portion 12 may interfit over sleeve 4. Sleeve 5 has another portion 13 whose diameter is slightly larger than that of the shaft so that sleeve 5 may slide along the shaft.

The inner surface of sleeve 5 is smooth so that it may securely ride along the shaft on the inner surface 13. An arrangement for anchoring movable sleeve 5 along its shaft 3 is shown by set screw 14 drilled into a suitable aperture in the shaft. Set screw 14 is positioned such that sleeve 5 will be limited in lateral motion along the shaft to a close abutting relationship to threaded fixed sleeve 4.

As can be seen, if the normal direction of rotation of propeller 9 is clockwise, fixed sleeve 4 and movable sleeve 5 will freely rotate with the shaft. If, however, the engine is disengaged from the shaft via the transmission and shaft 3 starts rotating in a counter clockwise direction, the threads 6 will engage the threads 12 drawing sleeve 5 along the length of sleeve 4 until the braking surfaces 11/7, and 8/10, respectively, contact one another, thereby locking movement of the shaft.

Spring 15 is provided under compression between set screw 14 and sleeve 5 to bias the sleeve into engagement with threaded sleeve 4. In order to stop the sleeve 5 from rotating upon counterrotation of the shaft, a pivoted C clamp 16 is provided for engaging sleeve 5 under control of Bowden wire 19. Clamp 16 is pivoted at point 17 and is mounted in a convenient location relative to sleeve 5 as by bracket 21.

The bowden wire 19 is connected to a convenient location for manual access such that, upon the shutdown of an engine, the Bowden wire is manually engaged as by handle 18 allowing the clamp 16 to pivot into engagement with sleeve 5 preventing the sleeve from continued rotation about the shaft. The C clamp 16 may be withdrawn from engagement with sleeve 5 by manipulation of the bowden wire or if more force is necessary, by spring biasing C clamp 16 so that it moves easily into and out of engagement with sleeve 5.

If desired, the C clamp may be constituted by a brake shoe with a similar shoe being formed for rotation with the shaft. Upon activation by the Bowden wire, the brake shoe on the C clamp would engage the rotating brake shoe on the shaft thereby locking the shaft.

I claim

1. A combination for preventing the rotation of a shaft in an undesired direction comprising: a shaft capable of rotation in either of two directions; a slidable cylindrical sleeve having an inner surface and an outer surface mounted on said shaft for movement therealong, said sleeve having a first directioned screw threaded portion commencing at one end thereof and extending along said inner surface for a portion of its length, and a first braking surface formed integrally with said sleeve on said outer surface; second directioned screw threaded means securely affixed to said shaft for receiving said screw threaded portion; a second fixed braking surface mounted in proximity to said screw threaded means for engaging said first braking surface; spring biasing means mounted on said shaft adjacent to the other end of said sleeve for urging said screw threaded portion into engagement with said screw threaded means; and means mounted in proximity to said sleeve for preventing rotation of said sleeve and causing said first braking surface to engage said second braking surface, thereby preventing further rotation of said shaft.

2. The combination of claim 1 wherein said rotation prevention means includes a C clamp pivotally mounted adjacent to said sleeve and bowden wire means connected to said C clamp for moving said clamp into and out of engagement with said sleeve.

3. A shaft lock arrangement for preventing rotation of the shaft in an undesired direction comprising: a shaft capable of rotation in two directions; a first braking surface slidably mounted on said shaft for movement therealong; a second braking surface mounted in proximity to said shaft for engaging said first braking surface, said second braking surface being mounted on a cylindrical sleeve having an inner surface, said inner surface having a first directioned screw threaded portion commencing at one end thereon and extending along said inner surface for a portion of its length, and means connected to said shaft for moving said first braking surface into engagement with said second braking surface to prevent shaft rotation in an undesired direction, said moving means including a second directioned screw threaded means mounted securely on said shaft for engaging said screw threaded portion upon the rotation of said shaft in said undesired direction, spring biasing means connected to said shaft for urging said sleeve into engagement with said second directioned screw threaded means.

4. The shaft lock arrangement of claim 3 further including manually actuable means mounted in proximity to said sleeve for preventing rotation of said sleeve with respect to said shaft.

* * * * *